INVENTORS
WILLIAM BRANDT GOLDWORTHY
and FRED LANDGRAF
BY
*Stedman B. Hoar*
ATTORNEY

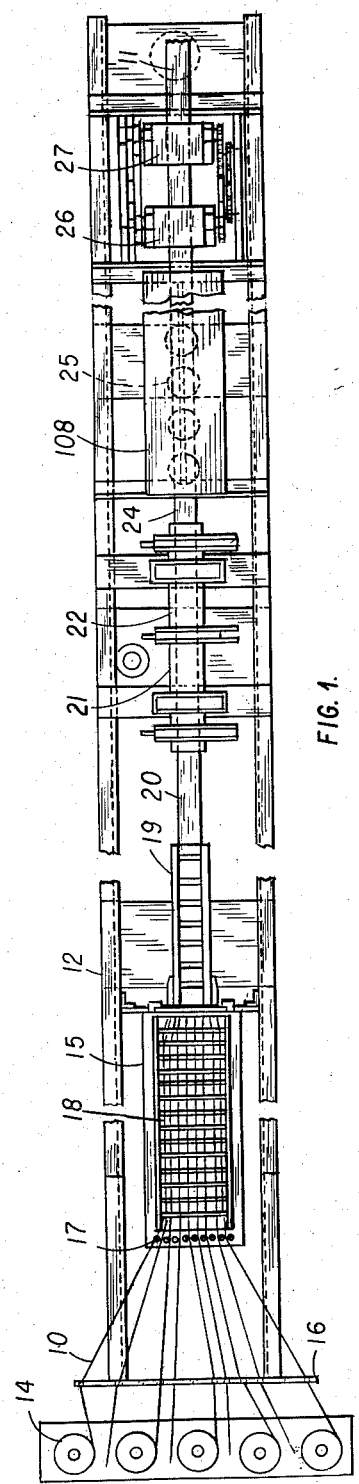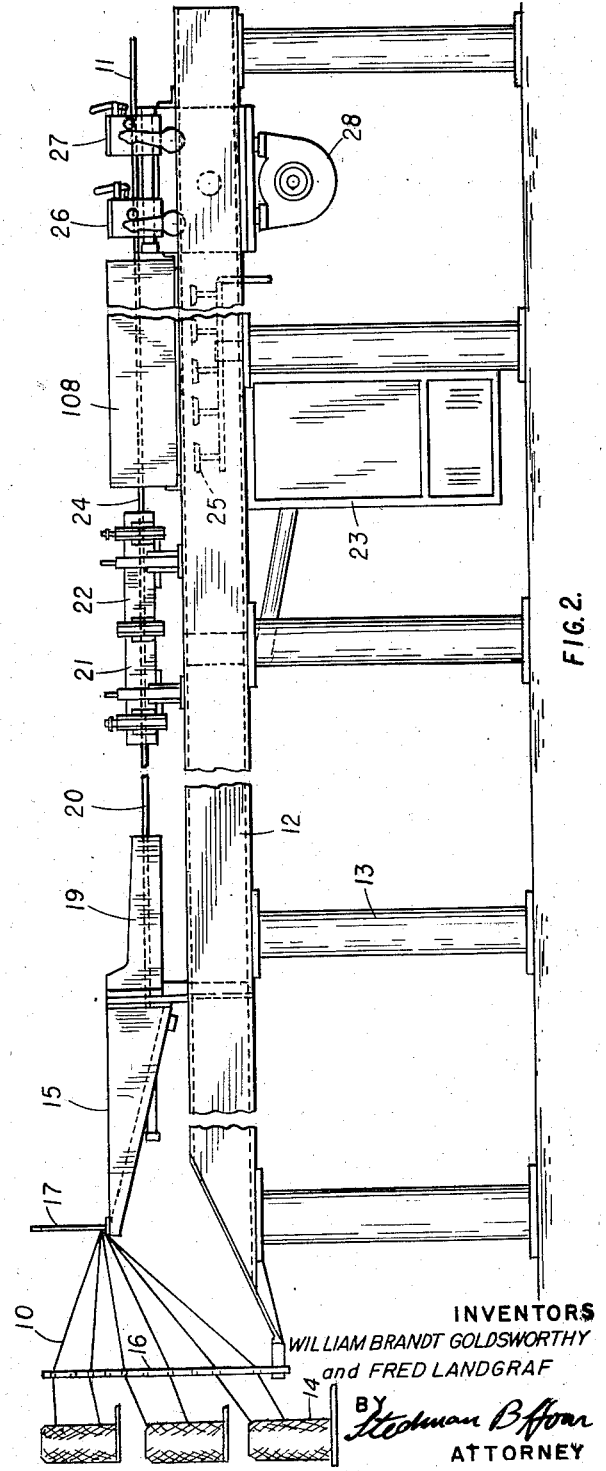

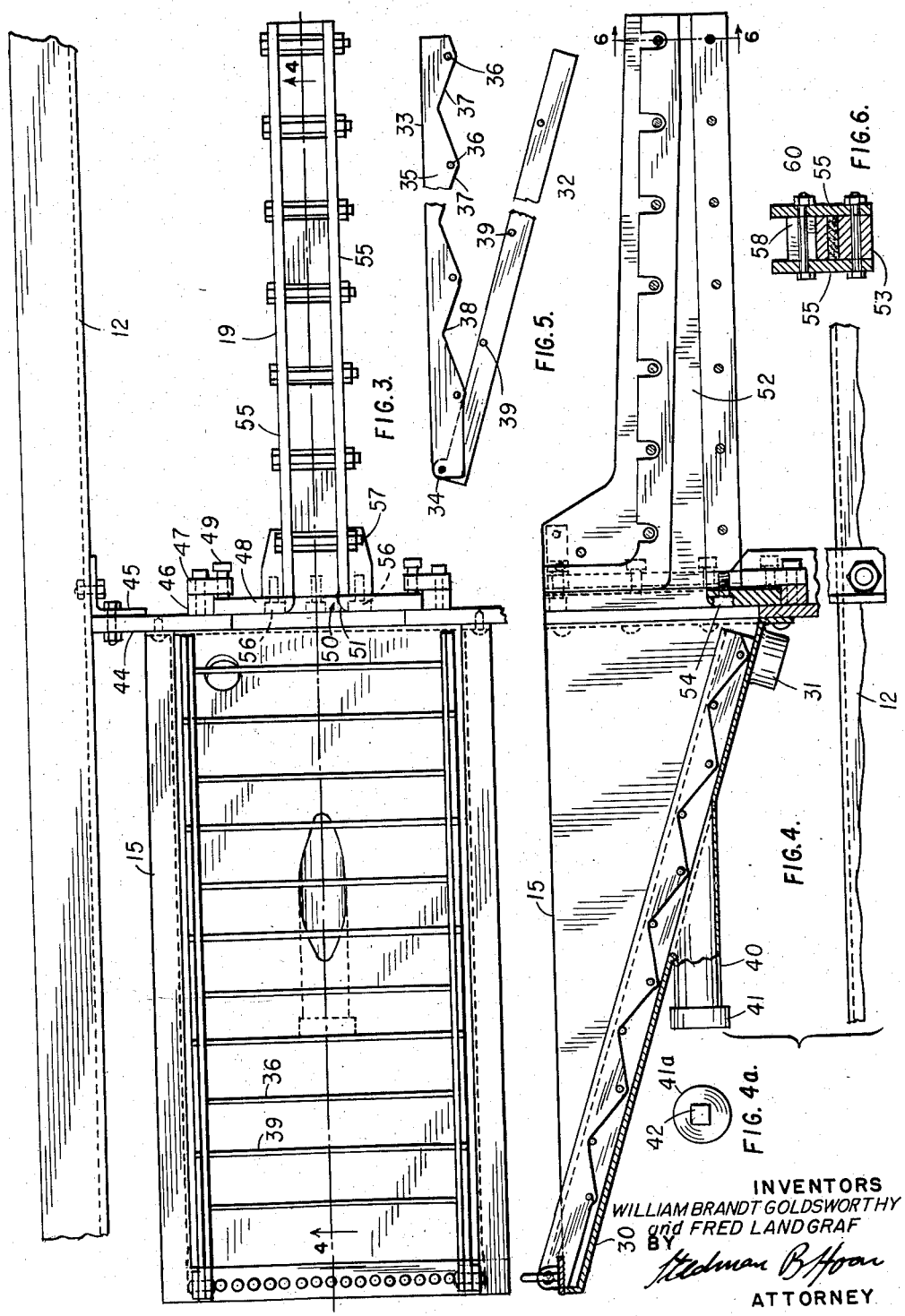

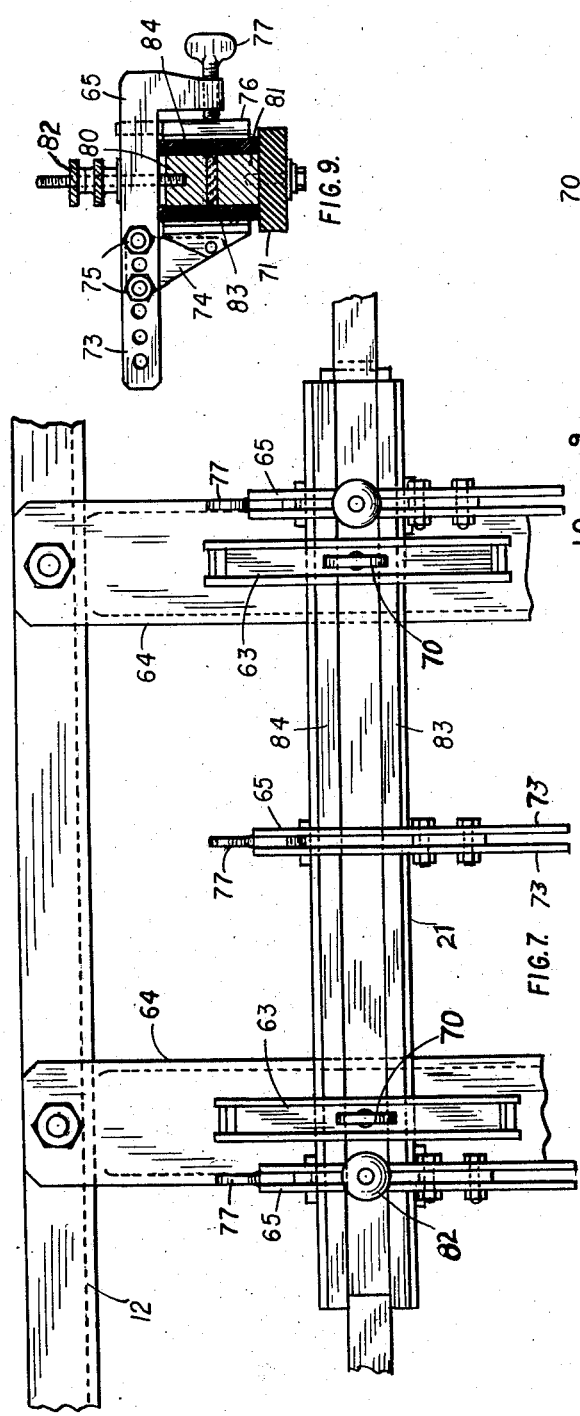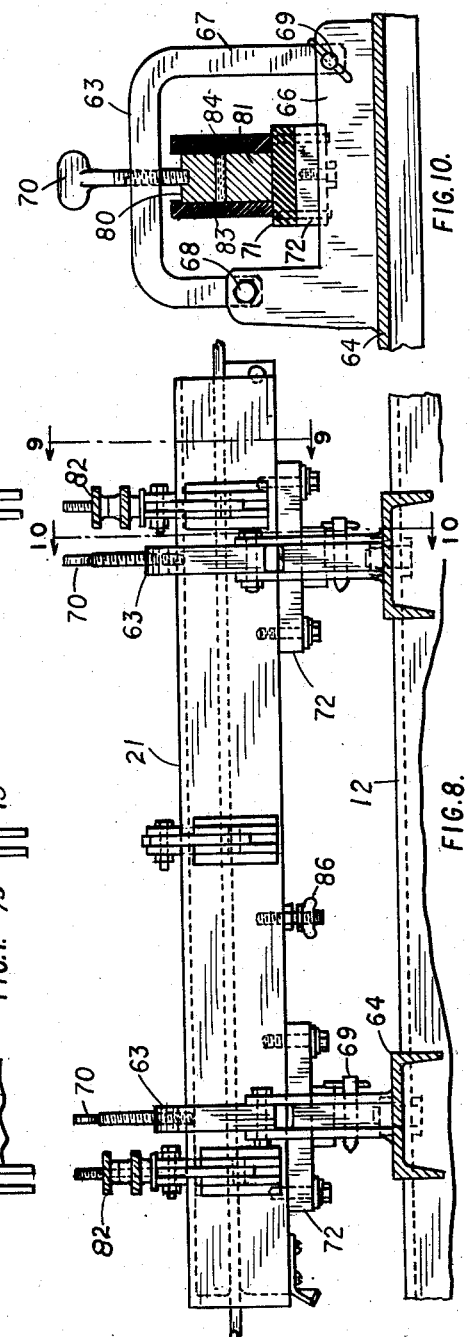

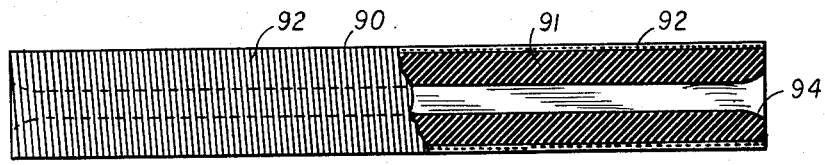
FIG. 11.
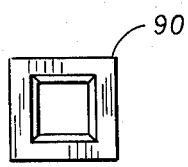
FIG. 12.
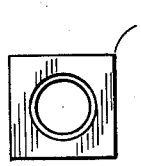
FIG. 13.
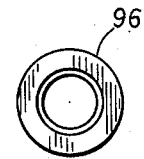
FIG. 14.
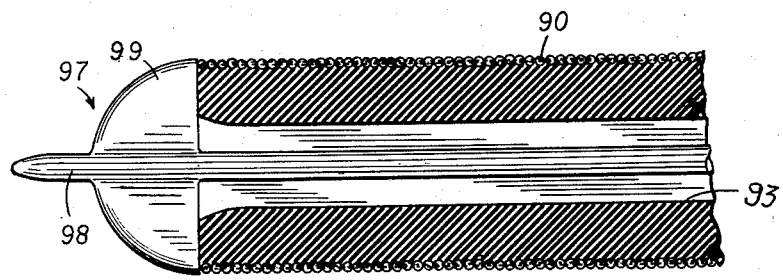
FIG. 15.
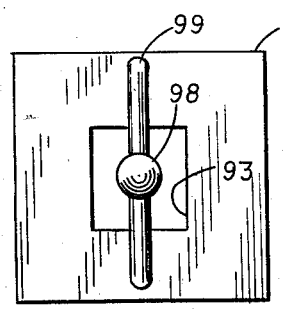
FIG. 16.
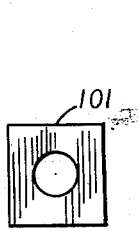
FIG. 20.
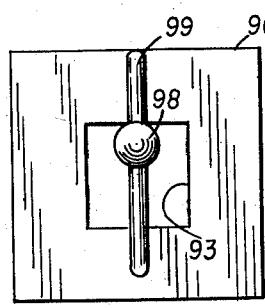
FIG. 17.
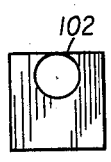
FIG. 21.
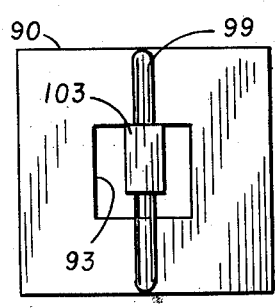
FIG. 18.
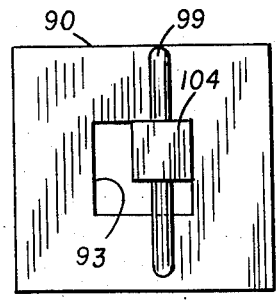
FIG. 19.
FIG. 22.  FIG. 23.
INVENTORS
WILLIAM BRANDT GOLDSWORTHY
and FRED LANDGRAF
BY
ATTORNEY Feb. 3, 1959 W. B. GOLDSWORTHY ET AL 2,871,911
APPARATUS FOR PRODUCING ELONGATED ARTICLES
FROM FIBER-REINFORCED PLASTIC MATERIAL
Filed Jan. 13, 1953 3 Sheets-Sheet 5

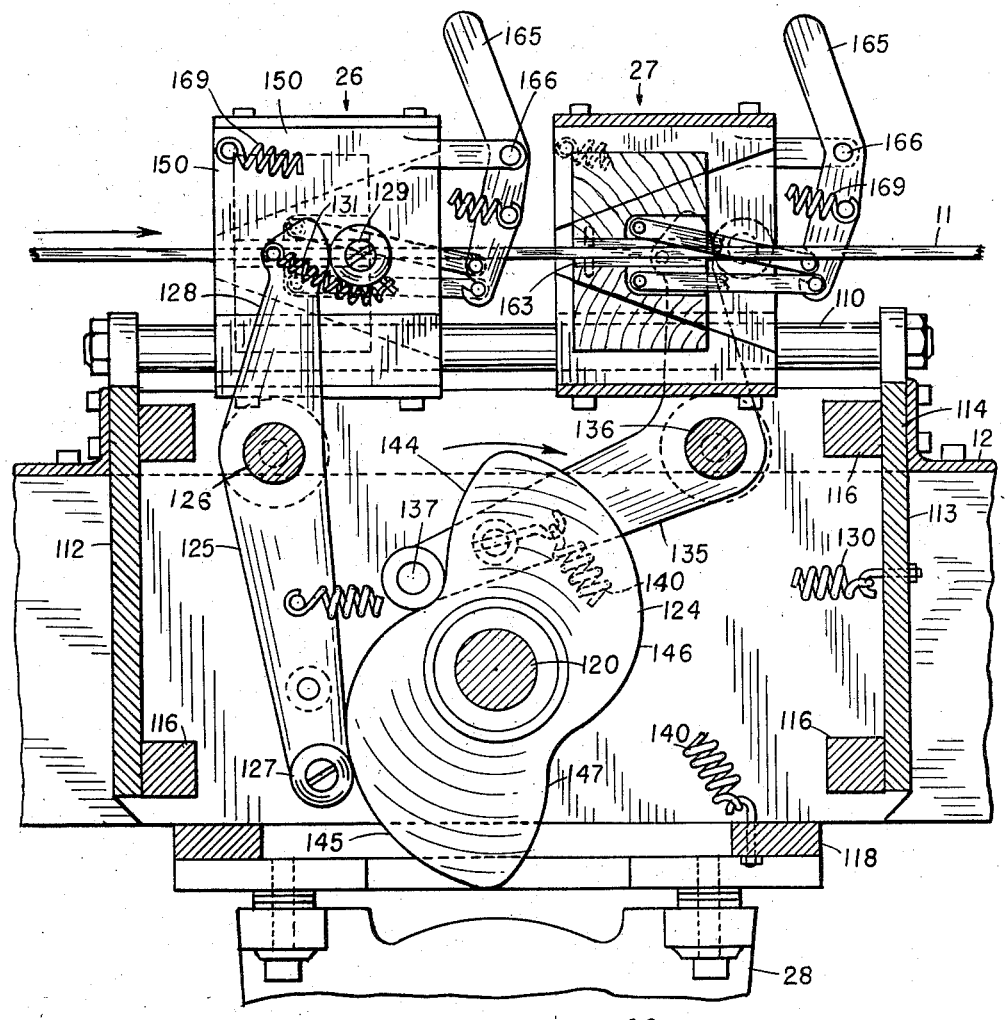
FIG. 26.
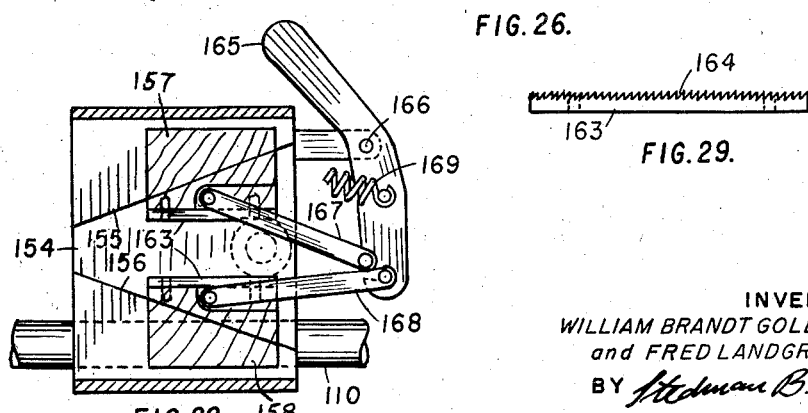
FIG. 28.
FIG. 29.
INVENTORS
WILLIAM BRANDT GOLDWORTHY
and FRED LANDGRAF
BY
ATTORNEY INVENTORS
WILLIAM BRANDT GOLDSWORTHY
and FRED LANDGRAF

ATTORNEY

United States Patent Office 2,871,911
Patented Feb. 3, 1959

2,871,911

APPARATUS FOR PRODUCING ELONGATED ARTICLES FROM FIBER-REINFORCED PLASTIC MATERIAL

William Brandt Goldsworthy and Fred Landgraf, Los Angeles, Calif., assignors, by mesne assignments, to Glastrusions, Inc.

Application January 13, 1953, Serial No. 330,962

4 Claims. (Cl. 154—1.7)

This invention relates to an apparatus for making plastic-impregnated, fiber-reinforced bars, tubes, and other elongated structural stock shapes, and has as an object the provision of means for taking fullest advantage of the tensile strength of the fibers in the process of manufacture in order to obtain extraordinary strength in the product.

Plastic-impregnated fiber products are now manifold, and the art of impregnating fibers of many types with synthetic resins of many kinds is well developed. Woven fabrics are so impregnated and spun fibers are so impregnated, either in woven form or in the form of yarn or of cables.

Glass fibers are often used as a base for impregnation, and other exceptionally strong fibers, such as nylon and jute, may also be used. But when such fibers become fixed in bent, twisted, or crinkled position in a mass of hardened plastic they lose some of their desirable qualities and fail to impart other qualities to the conglutinate mass. There is, for example, very little stretch to straight glass or nylon fibers. But let the fibers be spun into yarn, and the yarn will stretch considerably as the fibers adjust themselves under tension. If this spun yarn be impregnated with a resin and the resin then be polymerized to hardness, while the yarn is still capable of stretching, a tension applied to the conglutinate is applied primarily to the resin and not to the strands of the yarn. In other words, the yarn then acts merely as a carrier or base for the resin and not as a tensile reinforcement thereof. Likewise when a conglutinate of twisted or crinkled fibers is bent or twisted, the fibers themselves are in a condition and position to yield and the strain devolves principally upon the resin. If the fibers are very tightly spun or woven, they may not even make good carriers for viscous resins because of the difficulty of forcing the resins between the fibers. Minute entrained air-pockets left between the fibers in these conditions form centers of spreading networks of minute cracks.

It will be appreciated that many synthetic, mineral, or even vegetable fibers may have sufficient tensile and shear strength for reinforcing purposes and yet be so fine as to be very difficult to handle in loosely clumped groups, such as unspun roving or flakes. Particularly are they difficult to control when coated with sticky substances, forming loops and snarls if given the least opportunity to bend. Yet in the form of a stretched unspun roving they may provide greater inherent tensile strength than unstretched spun yarn, and save the cost of spinning.

With the foregoing desirable and undesirable qualities of fibers and fabrics in mind, it is a further object of this invention to provide mechanism for handling fibers in a continuous process involving impregnation, shaping a product, and curing, during which the fibers are under constant unrelaxed tension in the direction of the longitudinal axis of the product, so that they remain stretched in that direction when the product is solidified.

A further object of the invention is to provide means for impregnating a cluster or roving of substantially straight fibers with suitable resins, and shaping and curing the conglutinate mass so as to maintain the fibers substantially straight in the cured product.

Another object of the invention is to provide means for holding warp fibers of woven materials, or spun fibers of spun yarn, under very high tension during an impregnating and curing process so that the fibers are given no opportunity to relax to the crinkled or twisted condition natural to their woven or spun state.

Still another object of the invention is to provide efficient means for impregnating grouped fibers with temporarily liquid resins so as to exclude air-bubbles and to achieve a thorough and uniform coating of individual fibers.

Another object of the invention is to provide an apparatus by which, selectively, a wide variety of cross-sectional shapes may be obtained in elongated stock, and by which exterior lagging and interior cores and inserts may be added as desired and the stock cured after the addition.

It is a further object of the invention to provide an apparatus by which elongated, fiber-reinforced, plastic stock may be polymerized and cured continuously in a thorough and even manner at the instant that it is being shaped, the hardening occurring practically simultaneously throughout the cross-section of the stock so that outer and inner reinforcing fibers contained in the stock are not crinkled or relatively displaced.

Having in mind the foregoing objects and others which will be pointed out or will become apparent as the following specification proceeds, our invention in its broad aspects comprises continuously and steadily pulling grouped reinforcing fibers through a bath of liquid resin, then with increasing tension through mechanism which kneads and forces the resin between the fibers so as to coat each individual fiber with utmost thoroughness and to form a conglutinate of rope-like shape, then with even greater tension through shape-forming dies which give to the conglutinate the desired ultimate cross-sectional shape of the product, at least partially polymerizing the resin while the shaped conglutinate is within the shaping mechanism so as to insure retention of the applied shape, and if the polymerization has not been completed in the last-named step, completing it while the conglutinate is still under the continuous steady pull. The fibers may initially be grouped as a loose roving, or loosely spun, or they may be woven as in a tape or stocking. To carry out the process steps set forth above, we have devised apparatus to be more specifically described and claimed hereinafter, particularly adapted to extrude entrained air during the liquid impregnation stage and to provide an even, uniform, and rapid polymerization during the shaping and curing stage and adaptable in a novel manner to form and to cure a wide variety of bar, rod, and tubing shapes. Included in the novel apparatus are means for maintaining tension on the material during its progress through the various stages, and it is to be noted that the entire process is a continuous one and that the problems inherent in devising a process suitable to the desired novel product and in devising apparatus suited to the process are so complexly interrelated as to require simultaneous solution.

In the accompanying drawings illustrative of the apparatus now used in our process, Fig. 1 is a plan view of the apparatus, and Fig. 2 is a side elevational thereof, both figures showing the apparatus elements arranged relatively in the sequence of the steps of our continuous process, although not necessarily proportionately indicative of the relative duration of the steps;

Fig. 3 is a plan view on an enlarged scale of the feed end of the apparatus, showing the mechanism for forcing liquid resin between and around the fibers;

Fig. 4 is a longitudinal vertical sectional view on the line of section 4—4 of Fig. 3, showing details of a ladder element by which the fibers are worked while in the resin bath and of an impregnating nozzle by which the impregnated fibers are compacted and excess resin and air bubbles are removed;

Fig. 4a is an end view of a cap for admitting core elements to the resin bath;

Fig. 5 is a side elevational view of the ladder, showing it open to receive a roving of fibers;

Fig. 6 is a transverse sectional view on the line of section 6—6 of Fig. 4 showing how the impregnating and compacting nozzle is clamped upon the roving;

Fig. 7 is a plan view on an enlarged scale of the mounting of a shaping die and the heat-treating mechanism associated therewith;

Fig. 8 is a side elevational view of the mechanism shown in Fig. 7;

Figure 24:
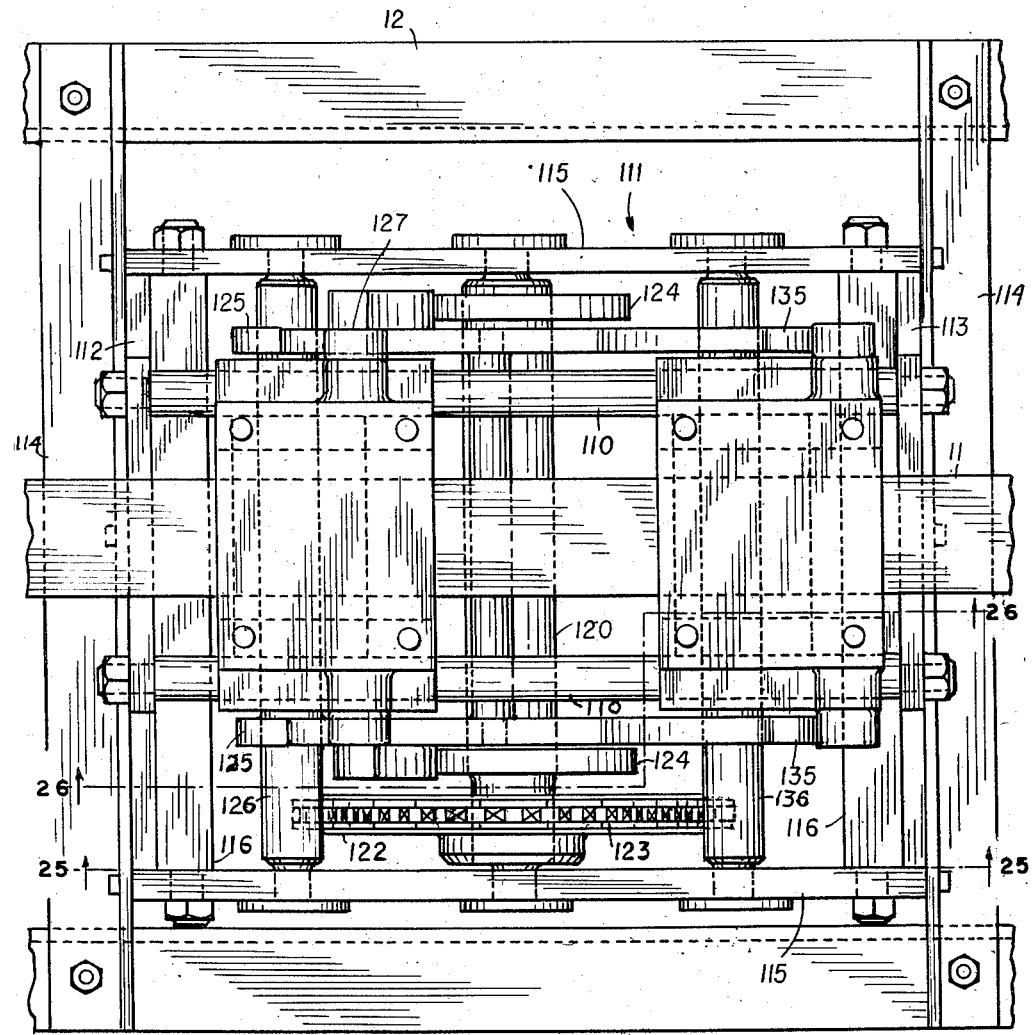
Figure 25:
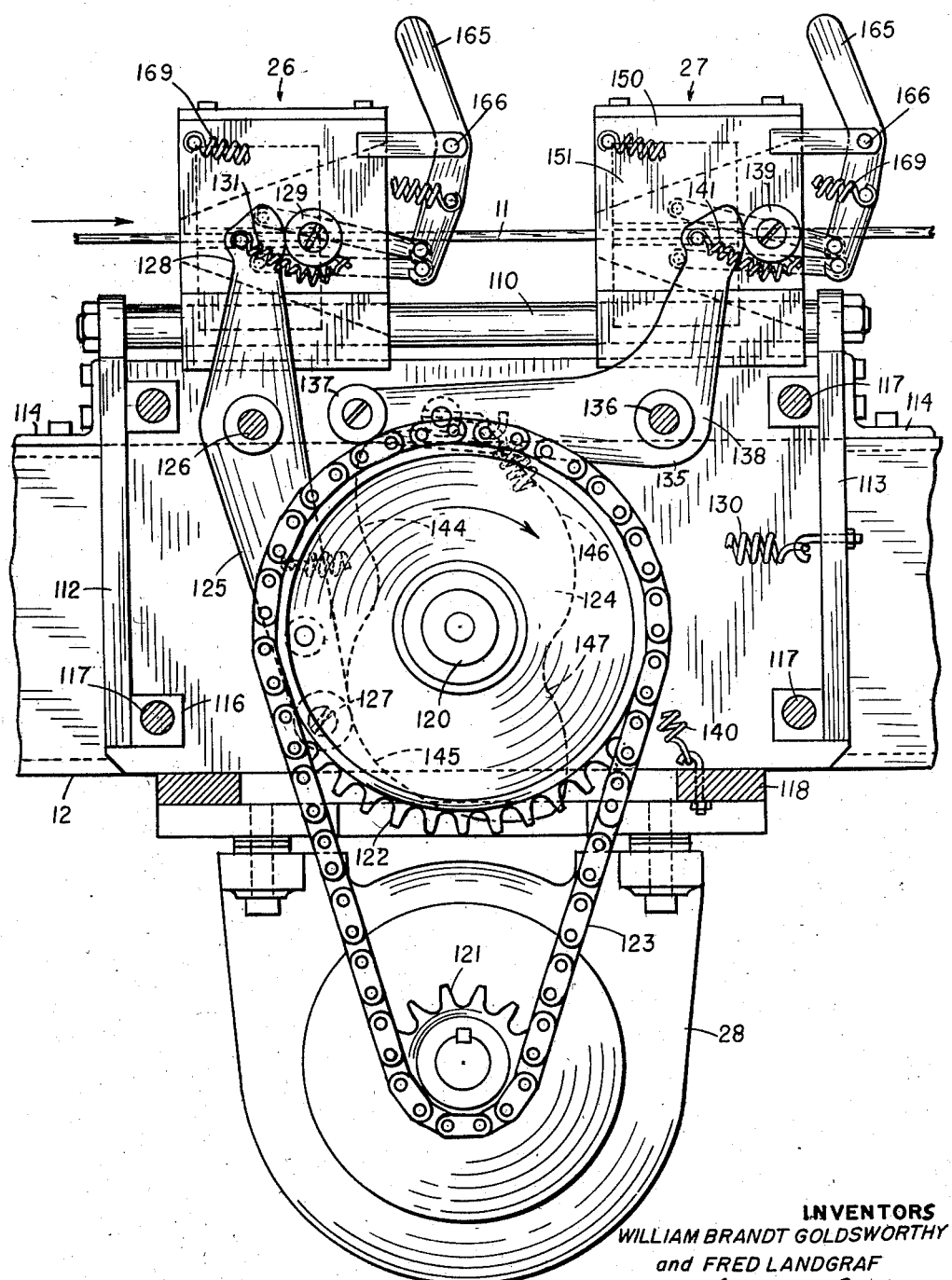
Figure 27:
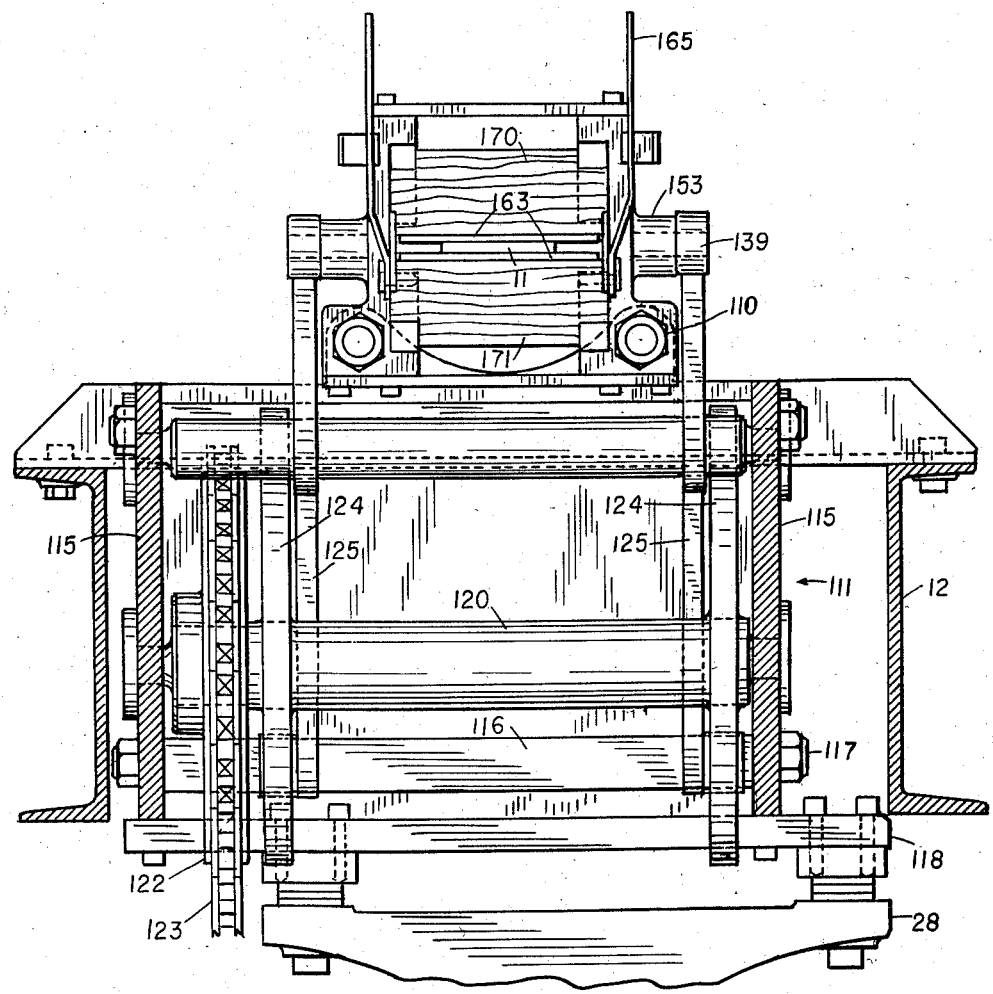
Figure 30:
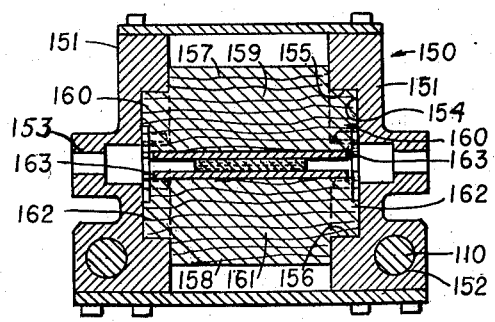

Figs. 9 and 10 are transverse sectional views on the lines of section 9—9 and 10—10 of Fig. 8, showing respectively the horizontal and vertical clamp employed to hold the shaping die;

Fig. 11 is a side view on a further enlarged scale of a modified form of shaping die which is pre-formed as a unit;

Figs. 12, 13, and 14 are end views of different shaping dies of the general character of the die shown in Fig. 11;

Fig. 15 illustrates on a still further enlarged scale the mounting of a core by which tubular or angular stock products may be shaped;

Figs. 16, 17, 18, and 19 are end views of various types of cores mounted in a die of the general character of the die shown in Fig. 13;

Figs. 20, 21, 22, and 23 are end views of the products to be obtained respectively from the assemblages of Figs. 16, 17, 18, and 19;

Fig. 24 is a plan view of the continuous tensioning mechanism for pulling the product through the impregnating and curing apparatus at constant speed;

Fig. 25 is a vertical longitudinal sectional view on the line of section 25—25 of Fig. 24, showing travelling clamps and their actuating cams in one position;

Fig. 26 is another vertical sectional view on the line of section 26—26 of Fig. 24, the clamps and cams being shown in a later stage of actuation;

Fig. 27 is an end elevation of the tensioning mechanism, with frame elements shown in section;

Fig. 28 is a vertical longitudinal sectional view through one of the travelling clamps, the clamp being shown with jaws apart;

Fig. 29 is an enlarged detail of a surfacing plate for a clamp jaw;

Fig. 30 is a transverse vertical section through a travelling clamp; and

Figure 31:
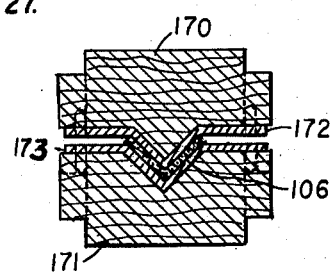

Fig. 31 is a detail in vertical transverse section showing a clamp jaw modified to grip an angle bar product.

As a loose roving of fiber lends itself to various cross-sectional shapes and to insertion of core-material, the use of fibers initially grouped as a loose roving is herein illustrated and described, and ways of substituting fibers grouped as woven tapes or stockings or as spun yarns will be obvious to those skilled in the art.

Referring now to the details of the drawings, the successive steps of our continuous tensioning, impregnating, and curing process are related to successive stages of apparatus which may be mounted in one long, relatively narrow machine, as illustrated in Figs. 1 and 2. Because fibers 10 enter at one end of the machine and are pulled by tensioning apparatus applied to the finished product 11 at the other end of the machine, a continuous frame 12 is provided to support the apparatus of individual stages and to receive the stresses applied thereto, and is shown mounted on columns 13. The fibers 10 will be received wound on spools 14, which are suitably mounted to rotate freely, and the fibers are collected and guided, as in spinning operations, to a resin bath in a tank 15, by means of a reticular plate 16 and separator pins 17. In traversing the bath in the tank 15, the fibers 10 are caused to weave between rungs of a ladder 18, gradually forming an impregnated but loose roving as they are drawn to a tapered compressing die 19. Emerging from the compressing die 19 the conglutinate but uncured roving 20 enters a shaping die 21 to receive its ultimate form. While in the shaping die 21 the roving is subjected to heat-treatment for curing it by polymerization to a hardness at which it will retain the impressed shape, and at this stage the heat is preferably applied by means of a high-frequency electronic heating device 22 with current from a generator 23. Additional heat-treatment may be applied externally to the hardened roving 24, by passing it over gas-burners 25, after which the product may be considered as in its finished stock form 11. The stock product 11 is grasped by two travelling clamps 26 and 27 which alternately advance, grasp, and pull with an action over-lapping in time, in the manner of pulling a rope with two hands, not hand-over-hand, but with one hand constantly behind the other, at least one clamp or hand pulling at all times. Thus the material worked upon, in the form of individual fibers 10, or conglutinate but uncured roving 20, or shaped and hardened roving 24, is pulled by the finished product portion 11 through the successive stages of apparatus at a constant speed with never-relaxing tension. The clamps 26 and 27 derive power from a variable speed drive 28.

We do not wish to be limited to the use of any particular kind of resin for impregnating the fibers 10, as numerous thermo-setting resins are commercially available and are suitable, such as polyester, phenolic, diallyl phthalate, silicone, and others, and the exact formulation will depend on the characteristics desired in the finished product.

Likewise the frequency of the electric current applied through the electronic heating device 22 is variable according to the nature of the resin. For example, a frequency of 45 megacycles per second has been found satisfactory when curing polyester resin, but higher or lower frequencies may be advantageous for curing other types of resin. The amplitude of the current will depend on the factor of time, as determined by the length of the device 22 and the contained shaping die 21 and by the variable speed drive 28, also upon the thickness and shape of the product.

To start the machine in action, the fibers 10 are passed between the rungs of the ladder 18 in the tank 15, through the tapered compressing die 19 and through the shaping die 21 in dry form, the tank 15 being for the moment drained of resins. The ends of the fibers 10 are clamped to a bar or rod and the bar is fed through the clamps 26 and 27. The tank 15 may then be filled with resin and the clamps are started in motion. Until heat is applied to harden the roving at the shaping die 21, the friction load will be well within the tensile strength of the uncoated fibers; therefore it will be advisable to cure the conglutinate roving temporarily only by the heat from the burners 25, to prevent gumming the clamps 26 and 27, and to increase the electronic heating at the die 21 gradually until a product of finished hardness reaches the clamps.

It should be noted that the use of two heating elements 22 and 25 is optional, as with many products it is possible to complete the curing at the shaping die 21. Also the order of heat application may be reversed, external heat being applied at the die 21 by placing the die in a heated tunnel, and dielectric or electronic heat for internal heating being applied, if necessary, after the roving has emerged from the die 21.

While the process and apparatus as described are intended and designed to maintain the fibers 10 in straight and parallel condition it is also within the scope of the invention to provide for laying the fibers in a long spiral. For this purpose, the compressing die 19 may be mounted in suitable bearings and be rotated very slowly by any suitable application of power. The conglutinate uncured roving 20 will by friction twist with the rotation of the die and the tension on it, being considerably less than on the later shaped and cured roving 24, will cause but little unlaying before the roving enters the die 21. An external lagging of wire or fiber may also be spirally applied to the roving 20 at this stage of the operation. It is also within the scope of the invention to provide for permanent inserts or cores, which may be wires or rods or tubes or even cloth or fibers of a different nature from those forming the longitudinal re-enforcement, and apparatus for inserting core material into the roving will presently be described with other apparatus details. Thus electro-conductive material may be heavily insulated. The core material may even be inserted intermittently; for example, reinforced plastic tubing may contain spaced metallic nipples capable of being tapped to receive threaded communicating elements.

The insertion of core material will occur at the initial stage of forming and impregnating a roving, and details of the various stages of apparatus will now be described, beginning with the impregnating mechanism and continuing stage by stage to the clamps which apply the motive power. For simplicity, the illustrations show the manufacture of a flat rectangular strip.

As heretofore described the fibers 10 enter the tank 15 through separator pins 17 and weave through the rungs of the ladder 18, all shown in greater detail in Figs. 3 and 4. The tank 15 has a sloping bottom 30 provided with a closable outlet 31. The ladder 18 has a lower section 32 which is fastened parallel to the sloping tank bottom 30, and an upper section 33 which is pivoted at 34 and which folds inside the side-bars of the section 32. The section 33 has dentated side bars 35, its rungs 36 being carried by the projecting dentations 37 and the indentations 38 being arranged to receive the rungs 39 of the section 32 when the two sections are folded together. The loose fibers 10 may thus be layed for a suitable distance upon the rungs 39 and then led between rungs 36 to the compressing die 19, and when the section 33 is pressed down to the position shown in Fig. 4, the fibers will be compelled to follow a weaving course.

A capped tube 40 is admitted to the tank 15 through the bottom 30 in alignment with the axis of the compressing die 19. The cap 41 will be a complete closure when no cores are to be inserted in the roving, and is interchangeable with other caps such as the cap 41a shown in Fig. 4a which has a bushing 42 through which an insert core may be passed in leak-proof manner. When cores are to be inserted through the bushing 42, such rungs 36 and 39 as might lie in the path to the die 19 may be removed.

The compressing die 19 has the function of forcing the resin into the fibers, and of forcing out any occluded air and excess resin. It also has the function of pressing the conglutinate roving upon any core which may be admitted through the tube 40. The die 19 is therefore made adjustable in size and shape so as to take different sizes of rovings with or without accompanying cores. A supporting plate 44, having the shape of a wide U, is secured to the frame 12 by brackets 45 and supports both the tank 15 and the die 19. To support the die 19, the plate 44 has spacers 46 and clamp fingers 47 bolted to it, and a head plate 48 is held firmly against the plate 44 by set-screws 49 threaded in the fingers 46. The head-plate 48 forms a narrower U than the supporting plate 44, having a slot 50 approximately conforming in width to the desired entrance width of the die 19 and slightly flared as shown at 51 on the side of the head-plate toward the tank 15. The die 19 itself is made of four long members which enclose a tunnel 52 tapering gradually from the entrance thereto at the flared slot 50. A floor-piece 53 is bolted to the head-plate 48 by a bolt 54; two side-walls 55 are bolted to the head-plate 48 by bolts 56 which enter flanges 57 on the side-walls; and a ceiling-piece 58 is clamped between the side-walls 55. The ceiling-piece 58 has a plurality of transverse grooves 59 on its upper surface, through which clamping bolts 60 extend between the side-walls 55. Thus the ceiling piece 58 is prevented from sliding longitudinally but has vertical adjustability. As shown in Fig. 4, the floor piece 53 may be horizontal and the ceiling piece 58 may be inclined thereto to provide the gradually tapering die tunnel 52.

When the conglutinate roving 20 enters the die tunnel 52 through the flared opening 51, it at once begins to be compressed. Excess resin and trapped air will be forced out of the opening 51, the resin returning to the tank 15. The roving 20 leaves the die 19 in compressed form, with the impregnation of resin forced thoroughly between the parallel fibers, but in a sticky plastic condition.

The roving 20 is now pulled into the shaping die 21, to be given its ultimate shape and to be hardened in that form. The die 21 may be composed of several separate pieces held clamped as in the compressing die 19 and as illustrated in Figs. 9 and 10; or it may be a unitary member as illustrated in Figs. 11 to 14. Clamps 63, secured to cross-members 64 of the frame 12, support and hold vertically the die 21, while clamps 65 compress the die from the sides. The clamps 63 have each a fixed arm 66 secured to a cross member 64, and a swinging arm 67 pivoted on a bolt 68 and locked by a bolt 69. Thumb-screws 70 are threaded in the arms 67, to give vertical compression of the die against blocks 71 of electrically insulating material which are supported by and secured to metal blocks 72, in turn supported by and secured to the fixed arms 66. The clamps 65 are of C-clamp type, with twin shanks 73, between which a fixed jaw 74 is adjustably held by bolts 75. A movable jaw 76, guided by the shanks 73, is pressed in opposition to the jaw 74 by a screw 77.

The die 21, in the composite form shown in Figs. 9 and 10 has upper and lower compression members 80 and 81, of steel or other electro-conductive material. The lower member 81 rests upon the insulating blocks 71. The upper member 80 is held at an initial desired spacing from the member 81 by screws 82 mounted between the shanks 73 of the clamps 65, from which initial position it may be pressed downward by the thumb-screws 70. Side members 83 and 84, of electrically insulating material are disposed between the clamp-jaws 74 and 76 and the die members 80 and 81, to be pressed in liquid-tight contact against the latter by the screws 77. As it is only necessary to support the upper die member 80 at its end in order to provide the initial spacing, such additional clamps 65 as may be found desirable intermediately of the end clamps may have the supporting screws 82 omitted.

The high-frequency electric current generator 23, shown conventionalized in Fig. 2, is connected electrically to the lower die member 81 by a connection 86. The conductive die member 81 is insulated from all other metal parts of the machine by the insulating blocks 71 and the insulating die members 83 and 84. Consequently the die members 80 and 81 become spaced electrodes and the high frequency current through the connection 86 follows the full length of the member 81 and grounds to the machine frame from the member 80, heating the full enclosed length of the conglutinate roving 20 by diathermic heating. It will be seen that with the addition of the generator 23 and connection 86, the shaping die 21 becomes by itself the before-mentioned electric heating device 22. However, if it be desired to cure the product at this stage by heat in another form, gas heat or other externally generated heat might be applied to the metallic die members 80 and 81. Then internal laminations of the product might be cured at a later stage by passing the product through a unit constructed on the principles of the unit 22, but not necessarily so tightly compressed.

In Figs. 11 to 23, we have shown a variety, by no means exhaustive, of dies and product forms derived therefrom, which may be substituted for the composite shaping die 21 or which may be held clamped within the die 21 or by parts thereof. In order to maintain the members 80 and 81 as electrodes, even though they no longer serve as shaping dies, the dies now to be described are made of insulating material, and we have found that dies may be made of the materials and in the manner of our own product, preferably with an external lagging of glass fiber, such dies having a resistance to expansion or bursting comparable to wire-bound metal tubes.

The die 90 of Fig. 1 is a tubular unit having a wall 91 of insulating material such as glass-reinforced resin, and may carry external spiral lagging 92. Preferably the entrance and exit to the bore 93 are flared slightly as shown at 94. In cross-section such a die may be externally and internally rectilinear, as illustrated by the end view of Fig. 12; or it may have the external rectilinear and internal curvilinear form of the die 95 of Fig. 13; or it may be curvilinear both externally and internally, such as the die 96 of Fig. 14. If the product is to be hollow or asymmetrical, a shaping core 97 may be placed in the die, comprising a rod 98 and a brace 99 preferably integral with the rod. The rod 98 will have the size and shape of the desired bore or cavity in the finished product. The brace 99 is a thin half-disk having its flat or diametrical side braced against the receiving end of the die. The conglutinate but unformed and uncured roving 20 will spread around the pointed end 100 of the rod 98 and around the curved edge of the brace 99, reforming around the rod 98 within the die 90. In Fig. 16, the rod 98 is shown as round and as placed centrally in the die 90. The resultant shape of the product is shown in the end view of the product 101 in Fig. 20. If the same rod 98 were placed at one side of the bore 93, as in Fig. 19, the product 102 would have substantially the shape shown in Fig. 21. The rod may be rectilinear in cross section as shown at 103 in Fig. 18 or 104 in Fig. 19, and channel forms 105 or angle forms 106 may be produced in the product by asymmetrical placement of the rods.

Upon leaving the die 21 the now formed and at least partly cured and hardened product 24 may be subjected to further heat-treatment. In the preferred form of our invention in which the initial curing is performed by a high-frequency electric current, the later heat-treatment may be performed by passing the product through a tunnel 108 over the gas burners 25.

The mechanism will now be described by which the conglutinate roving is pulled through the compressing die 19 and the shaping die 21 under constant and necessarily heavy tension. The two clamps 26 and 27 are mounted in tandem to reciprocate on parallel guide rods 110. The rods 110 are mounted between the forward wall 112 and the rearward wall 113 of a box frame 111 which is suspended upon cross-frame brackets 114 secured to the frame 12. Side walls 115 of the box frame 111, which houses the hereinafter-described cam and crank mechanism, are suitably secured as by cross-braces 116 and bolts 117. The variable-speed drive 28 is secured to cross-beams 118 on the bottom of the box-frame 111.

The variable speed-drive 28 drives a shaft 120 mounted between the side-walls 115, by sprockets 121 and 122 and a chain 123. Upon the shaft 120 are mounted two cams 124, of like design. A pair of bell crank levers 125, mounted to rotate on a cross-shaft 126, have roller cam-followers 127 which engage the cams 124 near the lower part of the cam orbit, and have upwardly extending arms 128 which engage rollers 129 mounted on the sides of the forward clamp 26. Springs 130, between the levers 125 and the rearward box wall 113 maintain the cam-followers 127 in contact with the cams 124. As will be seen from the rotational direction arrows A in Figs. 25 and 26, the high shoulders of the cams will oscillate the levers 125 so as to force the arms 128 against the rollers 129 and positively move the clamp 26 slidably on the rods 110 in the direction of the straight arrows B, that is toward the right in the illustrations and toward the rearward or product delivery end of the machine. The rollers 129 are connected to the arms 128 by springs 131, through which the clamp 26 is pulled slidably to the left, or in-feed end of the machine, when rotation of the cams 124 permits and tension on the springs 130 and 131 compels such movement. It will be obvious that leftward motion of the clamps 26 is not necessarily the smooth mechanical action which would be the direct result of positive cam action, but the leftward motion may start suddenly when contraction of the then-released springs 130 builds up sufficient tension in the springs 131. Also, if the springs 131 yield slightly and then pull the clamp 26 leftward to overtake the lever arms 128, there may be a deceleration quicker than the normal cam action when the rollers 129 overtake the lever arms 128. The reason why such slightly jerky action may be advantageous on the recovery (i. e. leftward) stroke of the clamp will be explained hereinafter.

The clamp 27 is caused to reciprocate upon the rods 110 in the same manner as the clamp 26 but with different timing. A pair of bell-crank levers 135 mounted to rotate on a cross shaft 136, have roller cam-followers 137 which engage the cams 124 near the upper part of the cam orbit, and have upwardly extending arms 138 which engage rollers 139 mounted on the side of the clamp 27. Springs 140, between the levers 135 and one of the bottom cross-beams 118, maintain the cam-followers 137 in contact with the cams 124. The rollers 139 are connected to the arm 138 by springs 141. The cams 124 and levers 135 provide positive mechanical action to move the clamp 27 toward the product-delivery end of the machine, and the springs 140 and 141 cause the clamp 27 to move towards the in-feed end of the machine when the cams 124 so permit.

As will be apparent from Figs. 25 and 26, the cam action upon the bell-crank levers 125 and 135 causes the clamps 26 and 27 to move in a hand-after-hand manner in relation to the product, the pulling stroke being to the right and the recovery stroke being to the left in those illustrations. In Fig. 25, the cam depressions 144 have passed the cam-followers 127 and the lever arms 128 are pushing the clamp 26 on the pulling stroke as the long cam shoulders 145 force the cam-followers 127 outward. The cam-followers 137 are at the peak of the cam shoulders 146, indicating that the bell-crank levers 135 have forced the clamp 27 to the end of its pulling stroke. An instant of cam-rotation later, as shown by Fig. 26, while the cam-followers 127 have moved only a short distance toward the cam shoulders 145 and the clamp 26 is consequently still slowly pulling, the cam followers 137 have quickly reached the cam depressions 144 and the clamp 27 has consequently been moved through the full recovery stroke. At an instant later, both the clamps 26 and 27 will be on their pulling strokes, and then while the clamp 27 continues to pull, the cam-followers 127 will pass the cam-shoulders 145 and quickly enter the cam depressions 147, causing the clamp 26 to make its recovery stroke. As the cam shoulders 145 and 146 are symmetrical, both clamps make two pulling strokes and two recovery strokes during each full cam cycle.

Because the cam-followers 127 and 137 rock with the bell-crank levers 125 and 135, one set of cam-followers will gain or lose slightly in angular spacing from the other set as the cam followers ride in and out upon the cams. As illustrated by way of example, the cam-rollers 135 are disposed at approximately ninety degrees of cam angle from the rollers 125, this angle varying as aforesaid due to the rocking motion. The relative angular dimensions of the cam drops and the cam rises may cause each of the clamps 26 and 27 to be on the pulling stroke for about four-fifths of a clamp reciprocation cycle and to be on the recovery stroke for about one-fifth of that cycle. The recovery stroke of each clamp occurs approximately mid-way of the pulling stroke of the other clamp.

While it might be possible to construct a uniform-motion cam having equal increments of rise in equal time units or angles of rotation, and further to adjust the bell-crank lever arms 128 and 138 and the rollers 129 and 139 so as to eliminate harmonic motion at those rollers in favor of uniform motion, and so to give the clamps 26 and 27 uniform and equal speed throughout their pulling strokes, whereby both clamps would pull equally upon the product during their periods of simultaneous pulling movement, such a construction is impractical. Unequal wear on different parts of the mechanism would destroy the uniform and equal speeds of the clamps and cause one clamp to gain on the other. Consequently no attempt is made to avoid harmonic motion, but the clamps are so constructed that if one clamp gains on the other while both are on the pulling stroke, the slower clamp will release its grip on the product and leave the pulling to the faster clamp. This is necessary because at this stage of the process the clamps are pulling upon a product made rigid by curing. In practice the rises of the cams 124 may be formed to provide a slightly irregular motion whereby each of the clamps 26 and 27 reaches maximum pulling speed just before the other clamp starts its recovery stroke, then taking over the pulling from said other clamp and continuing at speed until just before it—the pulling clamp—in turn begins its recovery stroke, when it decelerates and said other clamp having reached maximum speed, takes over. Thus a continuous pull is achieved at a substantially constant speed which is the maximum speed for which the drive 28 is adjusted.

To enable the clamps 26 and 27 to operate upon the rigid product 11 with a non-uniform speed, they are provided with sliding jaws actuated by wedge guides. As the clamps are identical, only one will be described in detail. The clamp 26 for example, as shown more particularly in Figs. 28, 29, and 30, has a box housing 150, the side walls 151 of which have longitudinal cylindrical bores 152 through which the guide rods 110 slide. Bearings 153 in the side walls 151 support the rollers 129. The inner sides of the side walls 151 have wedged-shaped recesses 154, symmetrical with respect to the longitudinal axis of the clamp. The upper shoulders 155 and lower shoulders 156 of the recesses 154 are spaced apart at the product-delivering end of the clamp and converge toward the product-receiving end of the clamp. The shoulders 155 and 156 thus form wedge guides for blocks 157 and 158, held slidably in the interior of the box housing 150. The upper block 157 has a central portion 159 fitting between the more closely opposed portions of the side walls 151, and wedge shaped side extensions 160 fitting the upper halves of the recesses 154 and slidable upon the wedge guides 155. The lower block 158 is similarly formed with a central portion 161 and side extensions 162 which fit the lower halves of the recesses 154 and slide upon the wedge guides 156. Motion of the blocks 157 and 158 toward the product-receiving end of the clamp causes the blocks to converge and motion in the opposite direction separates them. The blocks are preferably made of wood in order that their lightness may make them readily movable, and their opposed faces may be provided with metallic jaws 163 having rasp-like teeth 164 or other suitably rough surfaces with which to grip the product.

To hold the blocks 157 and 158 in forwardly convergent position and yet enable them to be retracted and spread apart when a product is to be fed onto them, levers 165 are provided at each side of the clamp, pivoted on trunnions 166. From the lower ends of the levers 165, links 167 are connected to the sides of the upper block 157 and links 168 are connected to the sides of the lower block 158. Light springs 169 connect the lower arms of the levers 165 to the sides of the housing 150. The tension on the springs 169 is only sufficient to urge the blocks 157 and 158 to the forward positions shown in Fig. 26, without pressure, and yields easily to rearward friction on the jaws 163 to permit the blocks to separate until the friction ceases. The position of the blocks when held apart to receive a product at the beginning of a process operation is illustrated in Fig. 28.

In Fig. 31 is shown a pair of blocks 170 and 171 shaped to grip an angle-bar product such as the product 106 illustrated in Fig. 23. The metallic jaws 172 and 173 of course conform to the opposed faces of the blocks. It will be obvious that other shapes of blocks may easily be substituted, the operation requiring only disengaging and re-engaging the links 167 and 168.

In the cycle of operation of an individual clamp, beginning at the beginning of the pulling stroke, the blocks 157 and 158 will be at forward positions in the recesses 154, with their metallic jaws 163 loosely and lightly in contact with the product bar 11. As the clamp begins its rearward pulling stroke, the jaws 163 will not immediately grip the bar 11 as they will, momentarily, be moving more slowly than the bar, but they will permit the bar to slide between them until the other clamp begins to slow down and their speed equals and for the instant exceeds that of the bar. Then the teeth 164 engage the bar 11 and cause the blocks to slide forward upon the wedge guides 155 and 156, so that the jaws 163 are tightly clamped upon the bar and actual pulling of the bar begins.

As the clamp under consideration begins to slow down for the recovery stroke, the other clamp takes over the pulling and reverse pressure upon the teeth 164 of the particular clamp causes the blocks thereof to move within the recesses 154 in the direction of travel of the bar 11, so as to loosen the grip of the jaws 163 and permit the bar to slide between them. When the cam-followers 127 or 137 actuating the particular clamp begin to follow the respective cam-drop, the clamp does not necessarily instantly respond and begin its recovery stroke, but it may pause until tension in the springs 130, 131, or 140, 141 develops to a degree causing the clamp to initiate its recovery stroke abruptly. This abrupt movement adds the inertia of the blocks to the effect of friction on the teeth 164, to cause the blocks to move apart and then to move forward to a new gripping position with a minimum of friction upon the bar 11. Thus preventing the teeth 164 from scraping upon the product during the recovery stroke both preserves the appearance of the product and lessens the burden upon the pulling mechanism.

As the end of the recovery stroke of the particular clamp is reached, the inertia of the sliding blocks is added to the light action of the spring 169 to bring the blocks to the position of light contact with the product 11, described at the beginning of the cycle of clamp operation. It has been found that although the inertia of heavy metal blocks would naturally be greater than that of comparatively light wooden blocks, the wooden blocks respond more uniformly on the gradients of the wedge guides 155 and 156 and more readily to the light springs 169. It is not desirable to have much tension in the springs 169, which act largely in opposition to friction on the jaws 163, because heavy tension would require heavy friction to overcome it.

Because the above-described pulling mechanism exerts a substantially constant speed pull upon the product, without perceptible relaxation at normal speeds, it is capable of overcoming much greater resistance than would be possible if the movement were irregular. Consequently it is possible to build up increasing tension to a very high stage as the product moves through the machine. In each successive stage, the space available for passage of the product is reduced in cross-area. The die 19 is obviously narrower than the tank 15; the die 21 is narrower than the die 19 and than the conglutinate roving which it receives therefrom. Neither the die 19 nor the die 21 can be permitted to yield or expand; in their composite structure of ceiling, floor, and side-walls, these wall elements must be clamped together with liquid-tight firmness. The over-all structure builds up increasing resistance to the pulling, which resistance however is kept within the tensile strength limits of the material worked on at each stage. The constant speed and graduated tension also keep the fibers stretched straight; the tension imparted by the die 19 is, for example, sufficient to prevent the outer laminations of the roving from peeling or sliding as the roving enters the die 21.

It will be apparent that we have devised a new apparatus for carrying out the above described process in an efficient manner which permits many variations in the exterior and interior shapes, the reinforcement, lagging, and inserts in the product. We have found that products made by our apparatus not only have great tensile strength, but when the reinforcement is that of straight fibers under heavy tension the products may be machined without fraying. So great is the tensile strength which is imparted by pulling the impregnated fibers through the shaping die 21 and hardening the resin throughout, instead of merely in outer laminations, while the tension is at a high maximum, that a rod of our product, of half-inch diameter may be bent in a four-foot diameter circle without fracture and will spring back to straightness when released. The rods and bars may be burnished and cut, and tubes may be tapped, without dislodging or fraying the reinforcing fibers held under tension in the surrounding resin.

We claim:

1. Apparatus for continuously producing an elongated article from a plurality of individual glass fiber strands and an unpolymerized liquid plastic material, comprising: a plurality of substantially parallel upstanding means to guide strands from bundles and for maintaining them separated, coating means for covering the bundles of strands with said unpolymerized liquid plastic material; a compressing die having an entrance side adjacent said coating means for receiving said coated strands and an exit side remote from said coating means, said compressing die having a channel therein corresponding in shape to the cross section of the finished article and of progressively decreasing cross-sectional area, a first portion thereof being of a greater cross-sectional area than said article whereby any occluded gases in the unpolymerized plastic will be squeezed therefrom within said compressing die and said unpolymerized liquid plastice material will be forced into said strands; a shaping die having an entrance side adjacent the exit side of said compressing die for receiving said coated strands and an exit side remote from said compressing die, said shaping die having a cross section substantially corresponding in shape and size to the desired cross section of the finished article, and said shaping die being formed of electrically insulating material; dielectric heating means for substantially completely curing the unpolymerized liquid plastic material while the strands with which it is coated are passing through said shaping die; and pulling means adjacent the exit side of said shaping die for engaging the finished article and moving it away from the exit side of said shaping die while maintaining the portion of each of said strands between the entrance side of said compressing die and the exit side of said shaping die in substantial alignment and under substantially equal tension, with said coating means, compressing die, shaping die and pulling means being in substantial longitudinal alignment.

2. Apparaus as set forth in claim 1, wherein a plurality of guide means are disposed in the path of said bundles of strands to position said strands over and under the same.

3. Apparatus as set forth in claim 1, wherein said shaping die includes a plurality of spaced facing members that serve as electrodes for carrying out said dielectric heating.

4. Apparatus as set forth in claim 1, wherein said coating means includes a tank containing said liquid plastic, and said tank includes means through which a core may be inserted into said compressing die as said strands pass therethrough.

References Cited in the file of this patent

UNITED STATES PATENTS

| | | |
|---|---|---|
| 2,141,405 | Randall | Dec. 27, 1938 |
| 2,228,748 | Berkebil | Jan. 14, 1941 |
| 2,261,847 | Dufour et al. | Nov. 4, 1941 |
| 2,296,948 | Pitman | Sept. 29, 1942 |
| 2,384,224 | Williams | Sept. 4, 1945 |
| 2,521,808 | Taylor | Sept. 12, 1950 |
| 2,526,945 | Gray | Oct. 24, 1950 |
| 2,565,003 | Simorda | Aug. 21, 1951 |
| 2,582,449 | Millar et al. | Jan. 15, 1952 |
| 2,622,874 | Haller | Dec. 23, 1952 |